United States Patent

Ishida et al.

[11] Patent Number: 6,086,188
[45] Date of Patent: *Jul. 11, 2000

[54] INK-JET PRINT HEAD HAVING PARTS ANODICALLY BONDED

[75] Inventors: Nobuhisa Ishida; Akihiro Shimokata, both of Kyoto, Japan

[73] Assignee: Rohm Co., Ltd., Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/045,240

[22] Filed: Mar. 20, 1998

Related U.S. Application Data

[60] Continuation of application No. 08/328,727, Oct. 25, 1994, abandoned, which is a division of application No. 07/994,544, Dec. 21, 1992, Pat. No. 5,396,042.

[30] Foreign Application Priority Data

Dec. 25, 1991 [JP] Japan .................................. 3-341681

[51] Int. Cl.$^7$ .................................................. B41J 2/045
[52] U.S. Cl. .................................................... 347/70
[58] Field of Search ................... 347/20, 68, 70, 347/71; 29/890.1, 25.35; 219/78.01, 78.02; 65/36, 40, 43, 50, 51

[56] References Cited

U.S. PATENT DOCUMENTS

| | | | |
|---|---|---|---|
| 3,397,278 | 8/1968 | Pomerantz | 257/650 |
| 4,083,710 | 4/1978 | Hewitt et al. | 65/40 |
| 4,158,847 | 6/1979 | Heinzl et al. | 347/68 |
| 4,189,734 | 2/1980 | Kyser et al. | 347/70 |
| 4,216,483 | 8/1980 | Kyser et al. | 347/70 |
| 4,285,714 | 8/1981 | Kirkpatrick | 65/40 |
| 4,312,008 | 1/1982 | Taub et al. | 347/70 |
| 4,364,070 | 12/1982 | Matsuda et al. | 397/70 |
| 4,367,480 | 1/1983 | Kotoh | 347/70 |
| 4,420,764 | 12/1983 | Okada | 347/68 |
| 4,451,335 | 5/1984 | Woods et al. | 204/35 N |
| 4,452,624 | 6/1984 | Wohltien et al. | 205/114 |
| 4,471,363 | 9/1984 | Hanaoka | 347/68 |
| 4,481,276 | 11/1984 | Ishikawa et al. | 430/281 |
| 4,520,374 | 5/1985 | Koto | 347/70 |
| 4,525,728 | 6/1985 | Koto | 347/70 |
| 4,528,575 | 7/1985 | Matsuda et al. | 347/71 |
| 4,546,362 | 10/1985 | Koto | 347/70 |
| 5,141,148 | 8/1992 | Ichivowa | 65/40 |
| 5,206,666 | 4/1993 | Watanabe et al. | 347/32 |

FOREIGN PATENT DOCUMENTS

| | | | |
|---|---|---|---|
| 29 18 737 A1 | 11/1979 | Germany . | |
| 54-146633 | 11/1979 | Japan . | |
| 55-158985 | 12/1980 | Japan | 347/20 |
| 62-130857 | 6/1987 | Japan . | |
| 62-265728 | 11/1987 | Japan . | |
| 63-265647 | 11/1988 | Japan . | |
| 2-80252 | 3/1990 | Japan . | |
| 3-92353 | 4/1991 | Japan | 347/70 |
| 2130528 | 6/1984 | United Kingdom . | |

OTHER PUBLICATIONS

Patent Abstracts of Japan, Apr. 17, 1991, JP–3–92353A, (Fuji Electric Co LTD) T. Saito.
Patent Abstracts of Japan, Dec. 10, 1980,JP–55–158985A, (Suwa Seikosha KK), S. Okada.
Patent Abstracts of Japan, Jun. 12, 1990, JP–2–80252A (Alps Electric co LTD), Sato et al.
Oyo Buturi (Applied Physics) vol. 60 No. 3, 1991.
"Room Temperature Anodic Bonding with Low Melting point Glass Film," H. Hebiguchi, et. al., Technical Digest of the 9th Sensor Symposium, 1990 pp. 31–34.

*Primary Examiner*—John Barlow
*Assistant Examiner*—C. Dickens
*Attorney, Agent, or Firm*—Wolf, Greenfield & Sacks, P.C.

[57] ABSTRACT

An ink jet print head can be formed by an anodic bonding process. In order to bond a vibrating plate to a head base, a glass surface is bonded to a conductive surface of an electrically conductive material through anodic bonding. One of the vibrating plate or the head base can be formed of glass and the other of an electrically conductive material in order to form the bond. Alternatively, a glass layer an electrically conductive layer can be formed on each of the pieces, which can then be bonded. Thus, by using appropriate layers, the head base and vibrating plate can be formed of plastic, glass or an electrically conductive material.

24 Claims, 5 Drawing Sheets

INK-JET PRINT HEAD HAVING PARTS ANODICALLY BONDED

This application is a continuation of application Ser. No. 08/328,727, filed Oct. 25, 1994, now abandoned, entitled INK-JET PRINT HEAD HAVING PARTS ANODICALLY BONDED, which is a divisional of application Ser. No. 07/994,544, filed Dec. 21, 1992, issued as U.S. Pat. No. 5,396,042 on Mar. 7, 1995, entitled ANODIC BONDING PROCESS AND METHOD OF PRODUCING AN INK-JETPRINT HEAD USING THE SAME PROCESS.

BACKGROUND OF THE INVENTION

1. Field of the Invention

The present invention relates to a process of anodic bonding between substrates and particularly to a method of producing an ink-jet print head which can be mounted in an electronic instrument such as a printer, a word processor, a facsimile machine, a plotter or the like.

2. Description of the Related Art

Various electric instruments include an ink-jet print head which functions as part of the printing mechanism thereof. There is known Kyser type of ink-jet print head. As shown in FIGS. 1 to 3, such a type of ink-jet print head generally comprises a head base 50 in which an array of individual ink passages 51 are formed. As best seen from FIG. 3, each of the individual ink passages 51 comprises an ink supply passage 51a, a pressure chamber 51b and a nozzle 51c. A vibrating plate 60 is joined over the top of the head base 50 and includes a plurality of piezoelectric elements 70 mounted thereon, each of which is positioned corresponding to the respective one of the pressure chambers 51b in the individual ink passages 51. When an electric field is applied to one of the piezoelectric elements 70 according to printing information, that piezoelectric element 70 is displaced. The displacement of the piezoelectric element 70 moves the corresponding part of the vibrating plate 60 to apply an instantaneous pressure to the ink which in turn is extruded from the individual ink passage 51 through its nozzle 51c. The extruded ink is thus sprayed toward a printing sheet.

In producing the Kyser type print head, the head base and vibrating plate 50, 60 are frequently formed of glass. It is customary that after the individual ink passages 51 have been formed on the glass head base 50, the glass vibrating plate 60 is adhered to the head base 50 using any suitable adhesive.

It is, however, difficult to apply the adhesive onto the substrate (the head base and vibrating plate 50, 60) with a thickness equal to or less than a certain level. In addition, the adhesive has a fluidity. For such reasons, the adhesive tends to flow into the individual ink passages 51 during the joining step, resulting in reduction of the width in the individual ink passages 51. This frequently causes the flow of ink to be disturbed or partially blocked in the individual ink passages on use of the ink-jet print head. Particularly, narrower ink supply passages and nozzles 51a, 51c connected to the individual ink passages 51 may be very easily blocked by the adhesive used, resulting in complete blockage of ink in the individual ink passages.

SUMMARY OF THE INVENTION

It is therefore an object of the present invention to provide a method of producing an ink-jet print head which can overcome the aforementioned problem with respect to the flowing of the ink into the individual ink passages and which can provide a sufficient joining strength even if the thickness of the adhesive layer applied is reduced so as to be thin as possible.

The present invention provides an anodic bonding process characterized by the steps of providing two substrates to be joined, that is, a head base and a vibrating plate in an ink-jet print head; forming a film of electrically conductive material on the joint surface of one of the substrates while forming a film of glass on the joint surface of the other substrate, depending on the materials of the head base and vibrating plate themselves; mating the joint surfaces of the head base and vibrating plate; and applying a voltage between the head base and vibrating plate with the conductive and glass joint surfaces being respectively used as anode and cathode while heating the head base and vibrating plate under pressure.

The present invention is based on the anodic bonding technique which is generally known as a process of joining a member of glass with another metal member without the need of any adhesive, that is, such a technique that at least two members of glass and metal to be joined to each other are superposed one above another and then subjected to application of a joining voltage while maintaining them at a temperature equal to or less than the softening point of the glass. In accordance with the principle of the anodic bonding, the joint surface of one of the head base and vibrating plate has a film which is made of electrically conductive material while the joint surface of the other of the head base and vibrating plate has a film which is formed of glass material. Thereafter, the head base and vibrating plate are joined to each other by applying a voltage therebetween while being subjected to pressure and heat. Therefore, the materials of the head base and vibrating plate may be freely selected. Since no adhesive is used in the anodic bonding process, there will not be raised such a problem that the adhesive flows into the individual ink passages to disturb and/or block them. In addition, the anodic bonding process provides a sufficient joining strength between the base head and vibrating plate even though the films of conductive and glass materials formed on the joint surfaces of the head base and vibrating plate depending on their materials are much thinner than that of the adhesive layer used and particularly have a thickness equal to or less than one $\mu$m.

BRIEF DESCRIPTION OF THE DRAWINGS

FIG. 2 is a cross-sectional view of FIG. 1 taken along a line A—A wherein.

DETAILED DESCRIPTION OF THE PREFERRED EMBODIMENTS

A method of producing an ink-jet print head which is embodied in accordance with the present invention will be described by way of example with respect to the drawings. It is, however, to be understood that the illustrated embodiment of the present invention is applied to case that both the head base and vibrating plate are made of glass material.

FIGS. 4A through 8 sequentially illustrate various steps in the process of the present invention. Although a single print head is shown in these figures for convenience sake, it is to be understood that a plurality of print heads are actually produced at a time.

Figure 5:
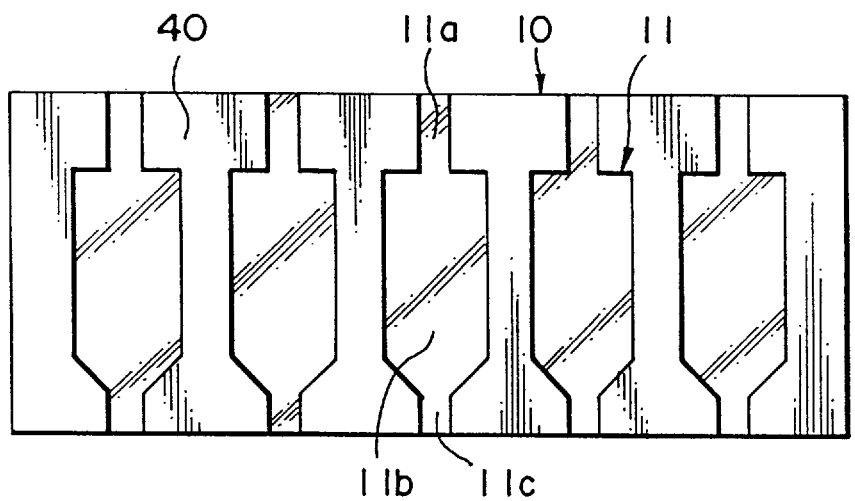
FIG. 5 is a plan view showing the surface of a head base shown in FIG. 4A.

Referring first to FIG. 4, an array of individual ink passages 11 are formed in a head base 10 which is made of glass. Each of the individual ink passages 11 is of such a configuration as shown in FIG. 5 which comprises an ink supply passage 11a formed in the rearward end of the head base 10, a pressure chamber 11b connected to the ink supply passage 11a and a nozzle 11c formed in the forward end of the head base 10 and connected to the pressure chamber 11b.

An electrically conductive film 40 having a uniform thickness equal to or less than one μm is then formed on the surface of the head base 10 through sputtering. As best seen from FIG. 5, the conductive film 40 covers the entire head base surface except the individual ink passages 11. A vibrating plate 20 made of glass material is superposed or mated on the surface of the head base 10 through the conductive film 40.

Figure 6:
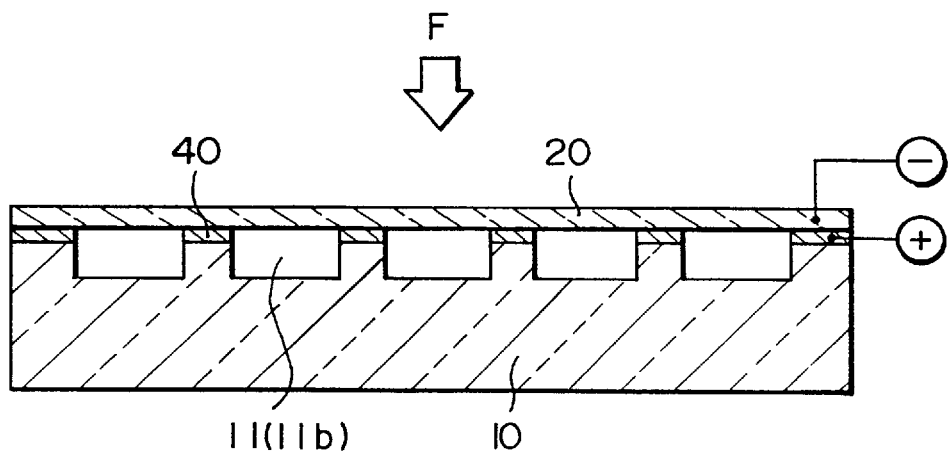
FIG. 6 illustrates a second step in the print head producing process begins as shown in FIGS. 4A and 4B.

As shown in FIG. 6, thereafter, an assembly of the head base and vibrating plate 10, 20 is placed and heated in air atmosphere at a temperature ranged between room temperature and 600° C. At the same time, a DC voltage ranged between 200 volts and 2000 volts is applied between the head base and vibrating plate with the conductive film 40 and vibrating plate 20 being respective anode and cathode while a load F ranged between about 200 g/cm² and about 400 g/cm² is being applied to the assembly. Under such conditions, the head base 10 is firmly joined to the vibrating plate 20 for a time period ranged between 10 seconds and 600 seconds depending on the materials of the head base and vibrating plate.

Figure 1:
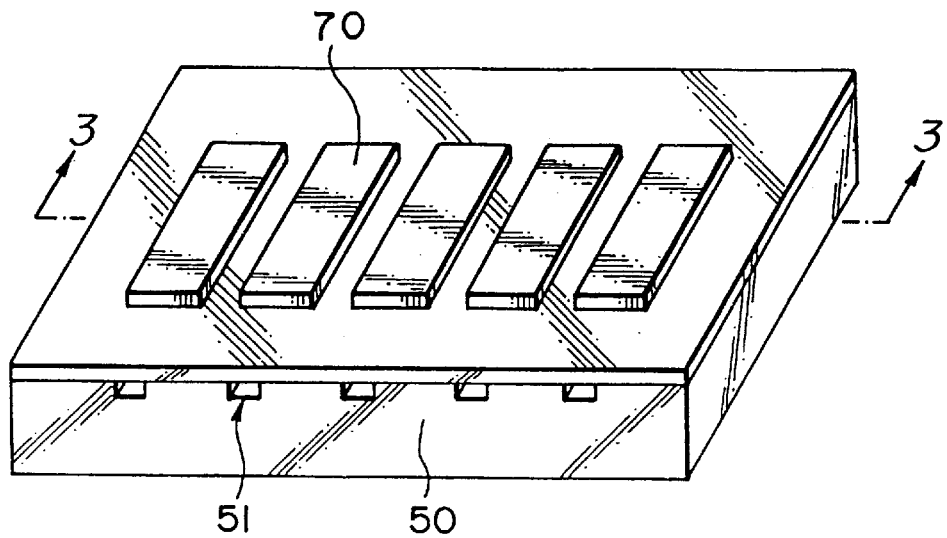
FIG. 1 is a perspective view of the outline of a conventional Kyser type print head.
Figure 2:
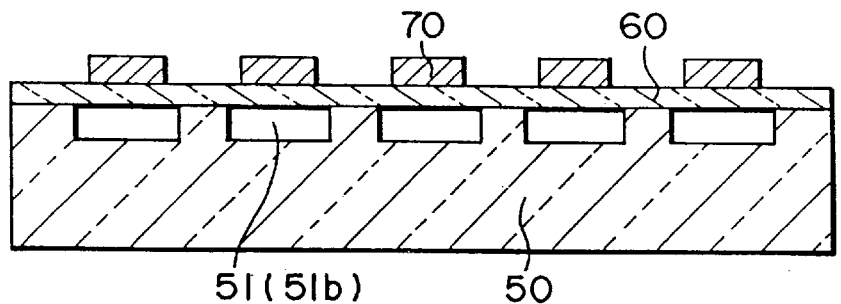
Figure 3:
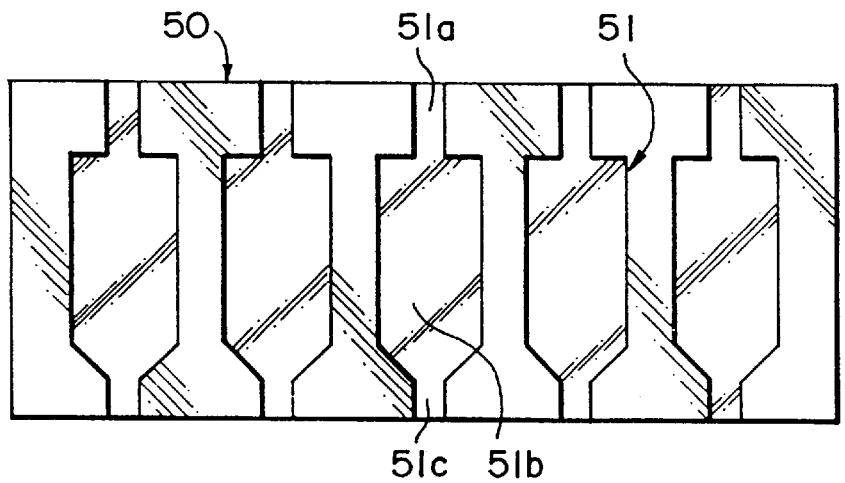
FIG. 3 is a plan view showing the surface of a head base shown in FIG. 2.
Figure 4A:
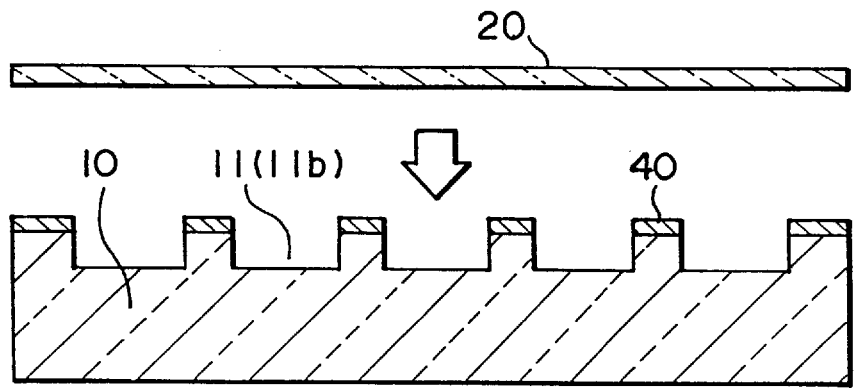
FIGS. 4A, 4B, 4C and 4D illustrate a first step in several alternate embodiments of a print head producing process constructed in accordance with the present invention.
Figure 7:
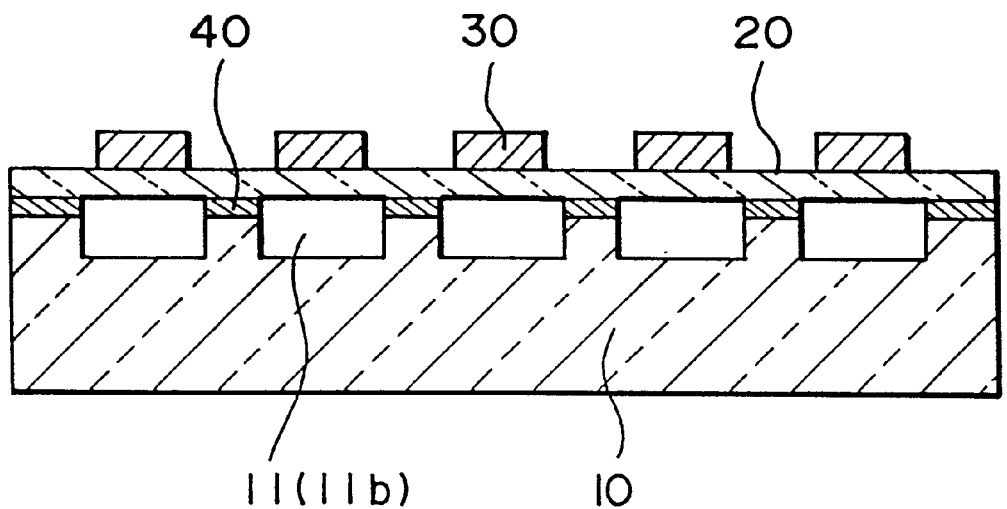
FIG. 7 illustrates a third step in the print head producing process of the present invention.
Figure 8:
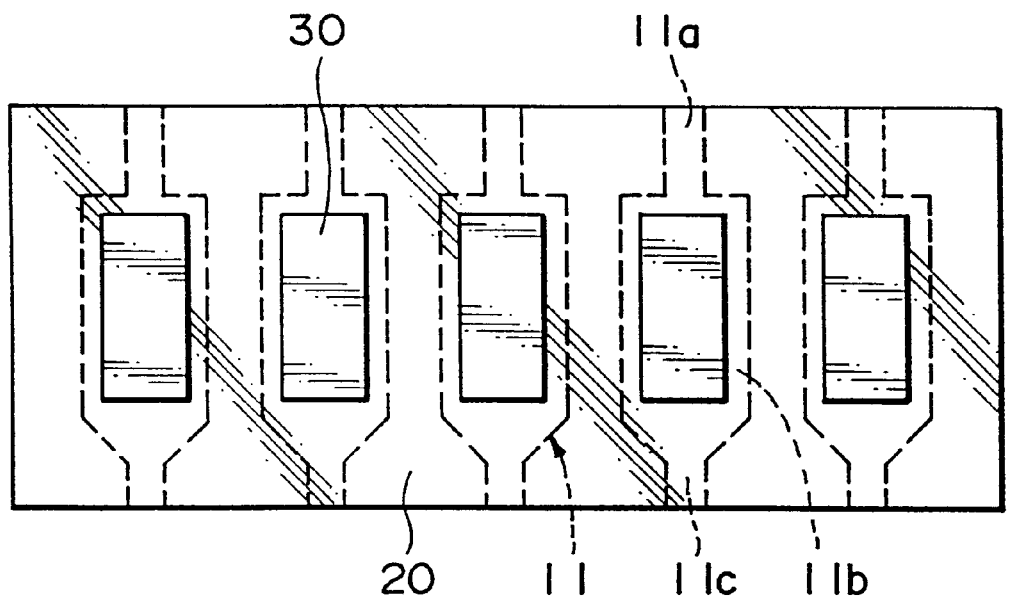
FIG. 8 is a plan view of a print head shown in FIG. 7.

After being joined, a piezoelectric element 30 is adhered to the vibrating plate 20 at a location corresponding to each of the pressure chambers 11b in the individual ink passages 11 through any suitable conductive adhesive (see FIGS. 7 and 8). In such a manner, an equivalent print head as shown in FIG. 1 may be produced.

Figure 4B:
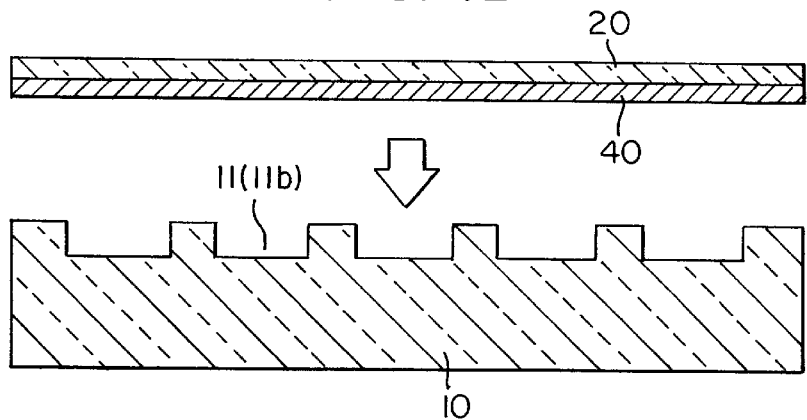
Figure 4C:
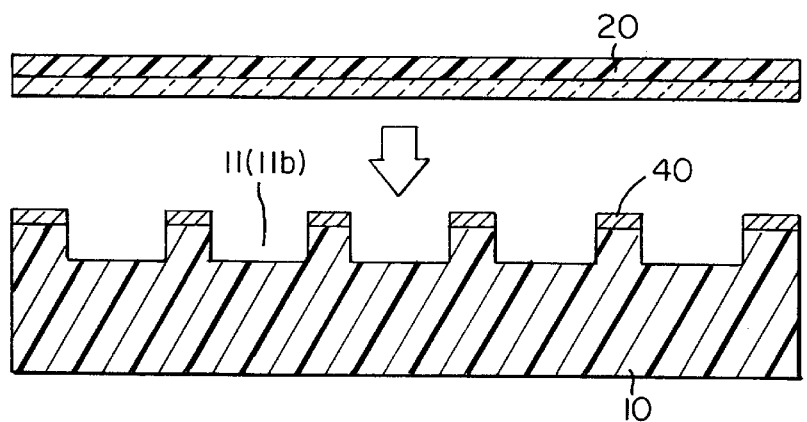
Figure 4D:
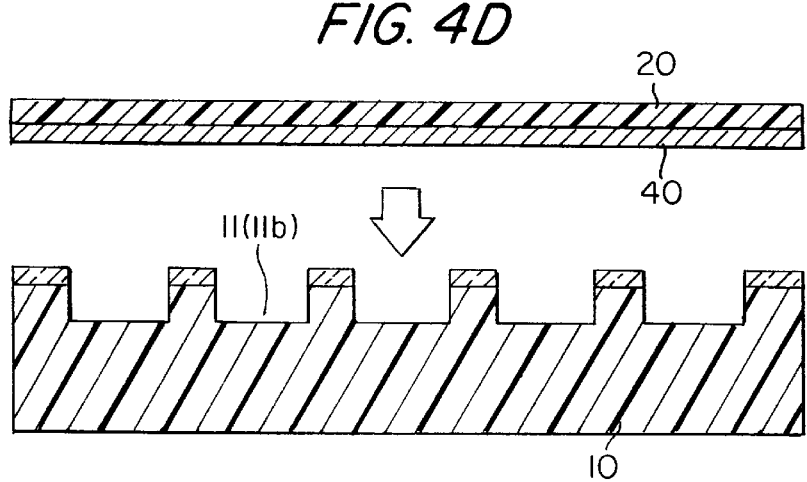

Although the embodiment of the present invention has been described as to the conductive film 40 formed on the joint surface of the head base 10, the equivalent joining advantage can be provided even if a conductive film is formed on the joint surface of the vibrating plate 20, as shown in FIG. 4B. Even if both the head base and vibrating plate 10, 20 are made of electrically conductive material, the process of the present invention may be similarly carried out. In the latter case, the illustrated conductive film 40 is replaced by a glass film which is formed on either of the head base 10 or vibrating plate 20.

If one of the head base and vibrating plate is made of glass while the other is formed of metal, the joint surfaces of these components may be bonded directly to each other by the anodic bonding process. However, if both the head base and vibrating plate are formed of electrically conductive or glass material or plastic material (see FIGS. 4C and 4D) or if one of the head base and vibrating plate is made of conductive or glass material while the other is formed of plastic material (see FIGS. 4C and 4D), the respective components must be coated with the conductive or glass material depending on the materials of the head base and vibrating plate themselves. More particularly, if both the head base and vibrating plate are formed of conductive material, the joint surface of one of these components is coated with a glass film formed therein. If both the head base and vibrating plate are made of glass, an electrically conductive film is formed on the joint surface of one of the head base and vibrating plate. If one of the head base and vibrating plate is made of conductive or glass material while the other component is formed of plastic material (see FIGS. 4C and 4D), the joint surface of the other component is coated with a glass or conductive film. If both the head base and vibrating plate are formed of plastic material, a conductive film is formed on one of the joint surfaces while a glass film is formed on the other joint surface. In such a manner, it is necessarily accomplished that one of the joint surface is formed of glass material while the other joint surface is made of conductive material. Therefore, the anodic bonding may be carried out against the head base and vibrating plate, irrespectively of their materials.

In the process of the present invention, the conductive and glass films may be formed through any suitable known technique such as sputtering, deposition, CVD (chemical vapor deposition), dipping or the like. The thickness of the respective conductive and glass films is substantially thinner than that of the adhesive layer and preferably equal to or less than about one μm. The electrically conductive material usable in the present invention includes silicon, aluminum or the like.

The process of the present invention can be performed under the conventional anodic bonding conditions, for example, under a pressure from a load ranged between 200 g/cm² and 400 g/cm² at a temperature from a heated air atmosphere ranged between room temperature and 600° C. However, when a glass film is to be formed on the joint surface of plastic material, the glass film is preferably of low-melting point glass, in view of the melting points of plastics in general. In this case, thus, the heating temperature will be ranged between room temperature and about 150° C. When a low-melting point glass film is formed on the joint surface of a glass substrate, the latter can be subjected to the anodic bonding process at a temperature lower than the normal level. DC voltage ranged between 200 volts and 2000 volts is used in the anodic bonding process of the present invention when the conductive and glass joint surfaces are set to be anode and cathode, respectively. Depending on the materials of the head base vibrating plate themselves, the process may be performed for a time period ranged between 10 seconds and 600 seconds.

Although the process of the present invention is characterized by the joining step, the other steps such as steps of forming a plurality of individual ink passages on the head base, mounting the piezoelectric elements on the vibrating plate at locations corresponding to the individual ink passages after formation of the individual ink passages, forming a pattern wiring relating to the piezoelectric elements and others may be carried out in accordance with the related art.

Figure 9:
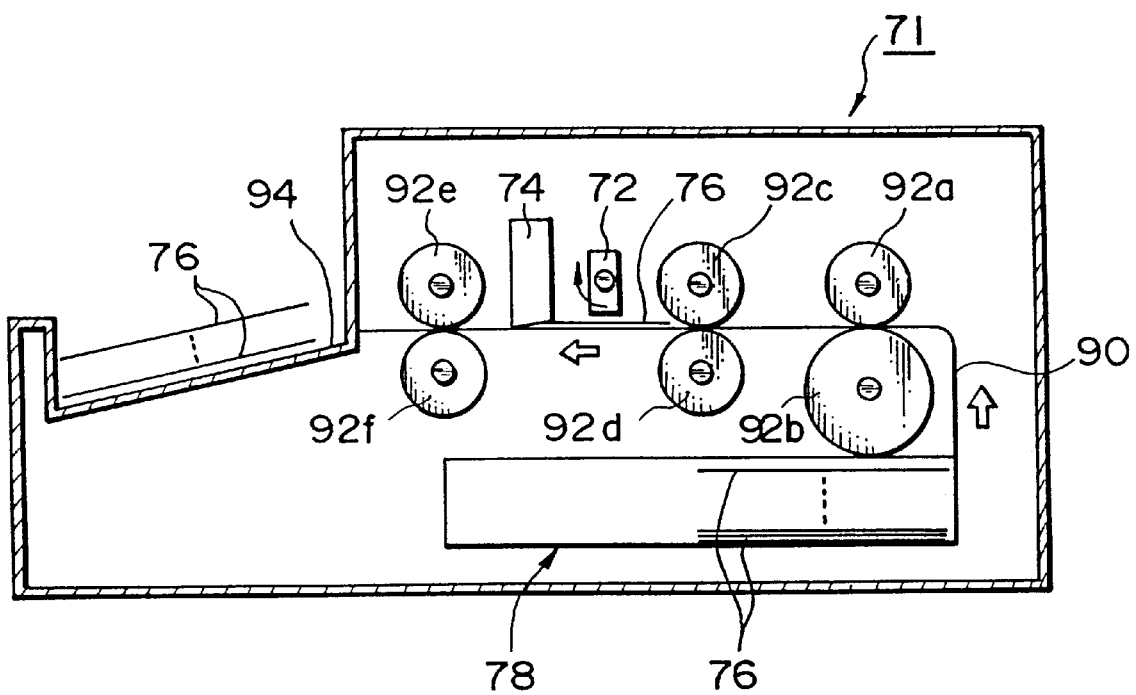
FIG. 9 is a schematic view of an apparatus provided with an ink-jet print head which is produced according to the anodic bonding process of the present invention.

Referring next to FIG. 9, there is schematically shown an ink-jet printer 78 provided with an ink-jet print head which is constructed in accordance with the present invention.

The ink-jet printer 78 comprises a paper tray 78 on which sheets of paper 76 are stacked; a conveying path 90 for conveying a sheet of paper at a time from the stacked sheet; three pairs of rollers (92a, 92b; 92c, 92d; 92e, 92f) for moving the sheets 76 along the conveying path 90; an ink-jet print head 72 constructed according to the present invention which is movably arranged on a line transverse to the conveying path 90 and adapted to spray the ink against the sheet of paper 76 moved thereto by the rollers (92*a*, 92*b* and 92*c*, 92*d*); a capping mechanism 74 for protecting the ink-jet print head and for drawing and exhausting an excess of the ink sprayed from the ink-jet print heads 72 onto the sheet of paper 76 when there is any failure such as clogging in the nozzle portion; and a sheet receiver 94 onto which the sheets of paper 76 are moved and stacked by the rollers 92*e*, 92*f* after the ink has been fixed on the sheets of paper 76.

In operation, the sheets 76 are fed out of the paper tray 78 one at a time. The sheet 76 is moved to the ink-jet print head 72 along the conveying path 90 by the rollers (92*a*, 92*b* and 92*c*, 92*d*). The ink is then sprayed onto the moved sheet 76 through the ink-jet print head 72 to form a desired image thereon. In use, the nozzle of the ink-jet print head is directed toward the sheet 76 as shown. When it is not used, however, the nozzle is oriented in a direction out of the sheet 76. Thus, the sheet will not be contaminated with ink even in the event of any wrong function.

The sheet 76 is then moved to and stacked in the sheet receiver 94 by the rollers 92*e* and 92*f*.

Thus, the materials of the head base and vibrating plate of the ink jet print head may be freely selected so that cost for the materials, or processing will be decreased. No adhesive is used in the anodic bonding process so that there will not be raised such a problem that the adhesive flows into the individual ink passages to disturb and/or block them. As the results, the appratus provides high quality printing.

The present invention is not limited to such an inkjet printer as described above, but may be similarly applied to any other apparatus having an ink-jet print head, such as a word processor, a facsimile, a plotter and the like.

What is claimed is:

1. An apparatus comprising:
an ink-jet print head including:
a head base having defined therein a plurality of individual ink passages; and
a vibrating plate constructed and arranged to cover said ink passages;
the head base and the vibrating plate formed of materials which cannot be bonded directly to each other by anodic bonding,
the vibrating plate having a surface of a glass material, and
the head base having an electrically conductive surface, the glass surface and the electrically conductive surface attaching said head base and said vibrating plate by anodic bonding; and
means for conveying a medium past the ink-jet head for receiving printing thereon.

2. An apparatus as defined in claim 1 wherein said apparatus is an ink-jet printer.

3. The apparatus of claim 1, wherein the vibrating plate is plastic, and wherein said glass material is a bonding layer of glass disposed on said vibrating plate.

4. The apparatus of claim 1, wherein the vibrating plate is glass.

5. The apparatus of claim 1, wherein the head base is glass.

6. An ink jet print head comprising:
a head base having defined therein a plurality of individual ink passages; and
a vibrating plate constructed and arranged to cover said ink passages; and
the head base and the vibrating plate formed of materials which cannot be bonded directly to each other by anodic bonding, wherein a surface of the head base is formed of glass material, and
a surface of the vibrating plate is formed of a conductive material, the glass and the conductive material cooperating to join the head base to the vibrating plate by anodic bonding.

7. The ink jet print head of claim 6, wherein the head base is plastic, and wherein the glass material is a glass layer disposed on said head base.

8. The ink jet print head of claim 6, wherein the vibrating plate is glass.

9. The ink jet print head of claim 6, wherein the head base is glass.

10. The ink jet print head of claim 6, wherein said glass material has a low melting point, said glass material located on a surface of the head base.

11. The ink jet print head of claim 10, wherein said anodic bonding is conducted at a temperature between room temperature and 150 C degree.

12. The ink jet print head of claim 11, wherein said head base and vibrating plate are subjected to a pressure between 200 g/cm$^2$ to 400 g/cm$^2$ during said anodic bonding.

13. An apparatus comprising:
an inkjet print head including:
a head base having defined therein a plurality of individual ink passages; and
a vibrating plate constructed and arranged to cover said ink passages;
the head base and the vibrating plate formed of materials which cannot be bonded directly to each other by anodic bonding,
the head base having a surface of a glass, material and
the vibrating plate having an electrically conductive surface, the glass surface and the electrically conductive surface attaching said head base and said vibrating plate by anodic bonding; and
means for conveying a medium past the ink-jet head for receiving printing thereon.

14. An apparatus as defined in claim 13 wherein said apparatus is an ink-jet printer.

15. The apparatus of claim 13, wherein the head base is plastic, and wherein said glass material is disposed on said head base.

16. The apparatus of claim 13, wherein the vibrating plate is glass.

17. The apparatus of claim 13, wherein the head base is glass.

18. An ink jet print head comprising:
a head base having defined therein a plurality of individual ink passages; and
a vibrating plate constructed and arranged to cover said ink passages; and
the head base and the vibrating plate formed of materials which cannot be bonded directly to each other by anodic bonding; wherein
a surface of the vibrating plate is formed of glass material, and
a surface of the head base is formed of a conductive material, the glass material and the conductive material cooperating to join the head base to the vibrating plate by anodic bonding.

19. The ink jet print head of claim 18, wherein the vibrating plate is plastic, and wherein the glass material is a glass layer disposed on said vibrating plate.

20. The ink jet print head of claim 18, wherein the vibrating plate is glass.

21. The ink jet print head of claim 18, wherein the head base is glass.

22. The ink jet print head of claim 18, wherein said glass material has a low melting point, said glass material located on a surface of the vibrating plate.

23. The ink jet print head of claim 22, wherein said anodic bonding is conducted at a temperature between room temperature and 150 C degree.

24. The ink jet print head of claim 23, wherein said head base and vibrating plate are subjected to a pressure between 200 g/cm$^2$ to 400 g/cm$^2$ during said anodic bonding.

* * * * *